US011113556B2

(12) United States Patent
Nanaumi

(10) Patent No.: US 11,113,556 B2
(45) Date of Patent: Sep. 7, 2021

(54) INFORMATION PROCESSING APPARATUS, PROGRAM, AND METHOD THAT DISPLAY CORRECTION CANDIDATE CHARACTER FOR SELECTED CHARACTER BASED ON FOUND CHARACTER STRING FROM MASTER DATA

(71) Applicant: CANON KABUSHIKI KAISHA, Tokyo (JP)

(72) Inventor: Yoshihito Nanaumi, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 271 days.

(21) Appl. No.: 15/448,199

(22) Filed: Mar. 2, 2017

(65) Prior Publication Data
US 2017/0262722 A1 Sep. 14, 2017

(30) Foreign Application Priority Data
Mar. 9, 2016 (JP) .............................. JP2016-045468

(51) Int. Cl.
*G06K 9/20* (2006.01)
*G06F 16/583* (2019.01)
(Continued)

(52) U.S. Cl.
CPC ....... *G06K 9/2081* (2013.01); *G06F 3/04886* (2013.01); *G06F 16/5846* (2019.01); *G06F 40/274* (2020.01); *G06K 9/228* (2013.01); *G06K 9/3258* (2013.01); *G06K 9/344* (2013.01); *G06K 2209/01* (2013.01)

(58) Field of Classification Search
CPC combination set(s) only.
See application file for complete search history.

(56) References Cited

U.S. PATENT DOCUMENTS 5,390,005 A * 2/1995 Kimoto ............. G03G 15/5016
345/173
6,167,411 A * 12/2000 Narayanaswamy .. G06F 3/0488
382/189

(Continued)

FOREIGN PATENT DOCUMENTS

JP 2014078203 A 5/2014

*Primary Examiner* — Tuyetlien T Tran
(74) *Attorney, Agent, or Firm* — Canon U.S.A., Inc. IP Division

(57) ABSTRACT

In an information processing apparatus, character recognition processing is executed on a character string image including a plurality of characters, and a character string as a result of the character recognition processing on the character string image is displayed. When any character in the character string displayed as the result of the character recognition processing is selected by a user, a correction candidate character for the selected character is displayed based on a character string in master data managed in a database, different from the character string displayed as the result of the character recognition processing in a predetermined number of characters and in at least the selected character. When the displayed correction candidate character is selected by the user, the character string as the result of the character recognition processing is corrected using the selected correction candidate character.

9 Claims, 15 Drawing Sheets

(51) Int. Cl.
*G06K 9/32* (2006.01)
*G06K 9/22* (2006.01)
*G06F 40/274* (2020.01)
*G06F 3/0488* (2013.01)
*G06K 9/34* (2006.01)

(56) References Cited

U.S. PATENT DOCUMENTS

| | | | | |
|---|---|---|---|---|
| 8,944,234 B1* | 2/2015 | Csulits | | G07D 7/004 |
| | | | | 194/206 |
| 9,147,275 B1* | 9/2015 | Hyde-Moyer | | G06K 9/685 |
| 2002/0168090 A1* | 11/2002 | Bruce | | G06K 9/033 |
| | | | | 382/101 |
| 2005/0273713 A1* | 12/2005 | Soin | | G06F 40/232 |
| | | | | 715/248 |
| 2005/0285931 A1* | 12/2005 | Maruyama | | G06K 9/228 |
| | | | | 348/14.01 |
| 2006/0049242 A1* | 3/2006 | Mejias | | G06Q 20/40 |
| | | | | 235/379 |
| 2006/0219773 A1* | 10/2006 | Richardson | | G06K 9/033 |
| | | | | 235/379 |
| 2007/0147659 A1* | 6/2007 | Eremita | | G06K 9/723 |
| | | | | 382/101 |
| 2007/0189613 A1* | 8/2007 | Tanaka | | G06K 9/80 |
| | | | | 382/229 |
| 2008/0150910 A1* | 6/2008 | Nakajima | | G06F 3/018 |
| | | | | 345/173 |
| 2010/0231733 A1* | 9/2010 | Dobashi | | G06K 9/00463 |
| | | | | 348/208.4 |
| 2012/0014601 A1* | 1/2012 | Jiang | | G06F 1/1626 |
| | | | | 382/173 |
| 2012/0313316 A1* | 12/2012 | Yamamoto | | G07D 7/2016 |
| | | | | 271/220 |
| 2014/0355076 A1* | 12/2014 | Shibutani | | G06K 9/344 |
| | | | | 358/473 |
| 2015/0049914 A1* | 2/2015 | Alves | | G06K 9/033 |
| | | | | 382/105 |

* cited by examiner

FIG.1
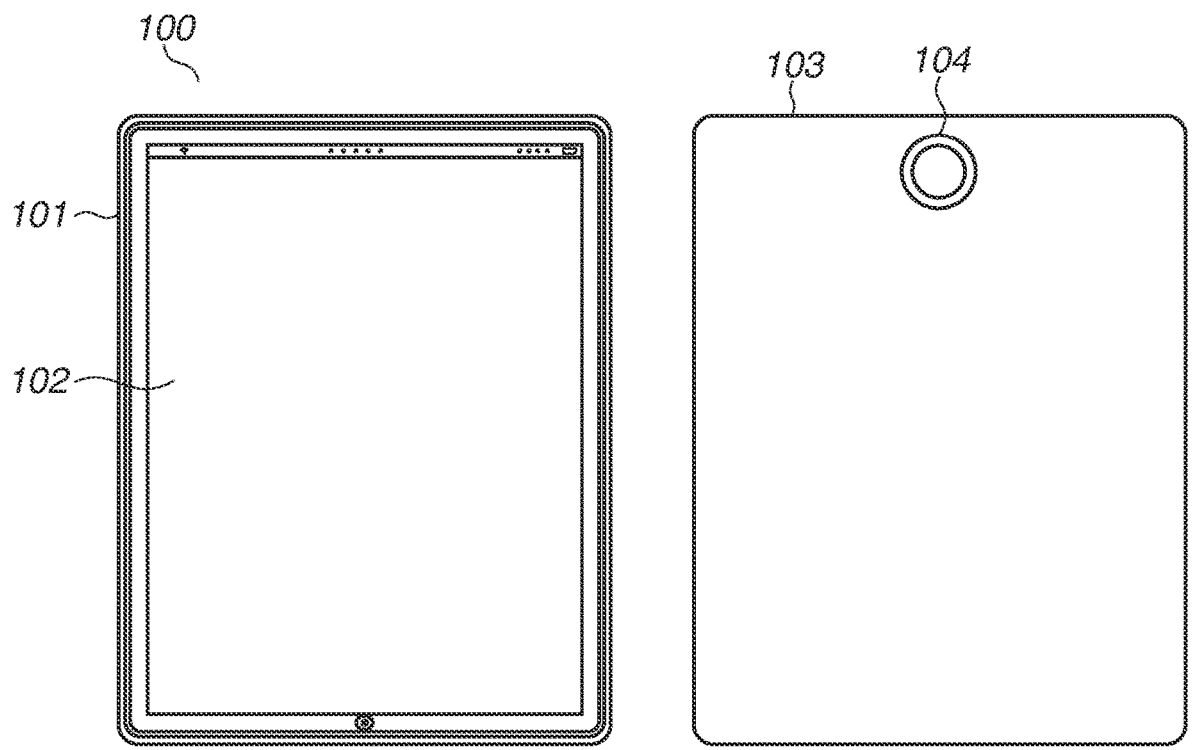
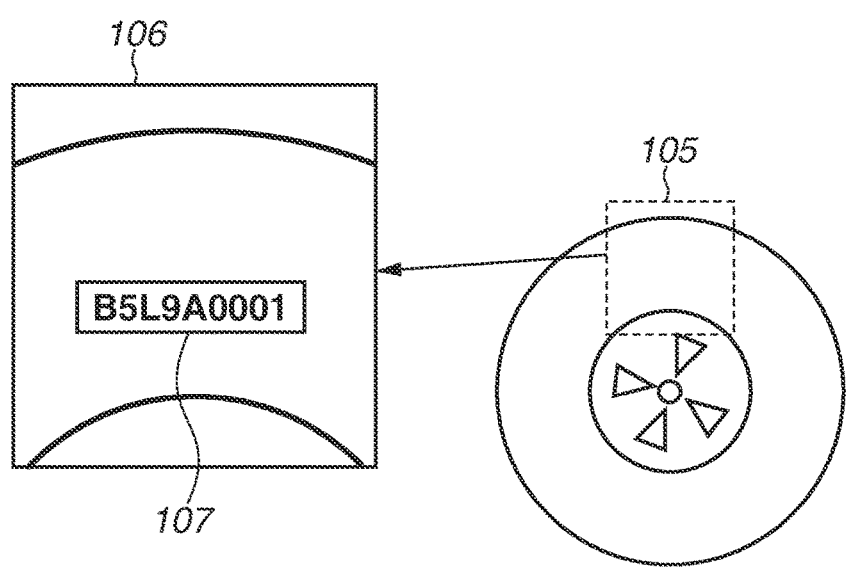

FIG.5 serialTable 500

| | id | serialID |
|---|---|---|
| 501 | 1 | B5L9A0001 |
| 502 | 2 | B5L0Z0061 |
| 503 | 3 | B5L1Z0061 |
| 504 | 4 | B5L8Z0001 |
| | ... | ... |

INFORMATION PROCESSING APPARATUS, PROGRAM, AND METHOD THAT DISPLAY CORRECTION CANDIDATE CHARACTER FOR SELECTED CHARACTER BASED ON FOUND CHARACTER STRING FROM MASTER DATA

BACKGROUND OF THE INVENTION

Field of the Invention

The present invention relates to an information processing apparatus, a program, and an information processing method.

Description of the Related Art

Recently, it has been easy to capture image information including character information with smartphones and digital cameras being widely used. This has made way for various use cases involving capturing character information through character recognition processing in various observing environments. For example, tires used by dump trucks may be managed in quarries such as mines with a serial number marked on the tires. This management may be performed using a result of character recognition processing executed on an image including the serial number marked on the tire, captured with a smartphone, a digital camera, or the like. A tire manufacturer has a master database for managing serial numbers of the manufactured tires. Thus, database matching may be performed with the result of the character recognition to be output limited to data in the database, so that higher recognition accuracy can be achieved.

Japanese Patent Application Laid-Open No. 2014-078203 discusses a technique in which candidates of a result of character recognition processing on an image to be output are limited to character strings in a database storing therein serial numbers or model numbers.

When the result of the character recognition processing is limited to a character string in a database as in Japanese Patent Application Laid-Open No. 2014-078203, a similar but incorrect character string, stored in the database, is likely to be output as a result of the recognition executed on a character string image with a large amount of noise.

SUMMARY OF THE INVENTION

An information processing apparatus according to an aspect of the present invention includes a memory that stores a program of instructions and at least one processor in communication with the memory. By executing the program of instructions, the at least one processor performs executing character recognition processing on a character string image including a plurality of characters, displaying a character string as a result of the character recognition processing on the character string image, displaying, when any character in the character string displayed as the result of the character recognition processing is selected by a user, a correction candidate character for the selected character based on a character string in master data managed in a database, different from the character string displayed as the result of the character recognition processing in a predetermined number of characters and in at least the selected character, and correcting, when the displayed correction candidate character is selected by the user, the character string as the result of the character recognition processing using the selected correction candidate character.

Further features of the present invention will become apparent from the following description of example embodiments with reference to the attached drawings.

BRIEF DESCRIPTION OF THE DRAWINGS

FIG. 1 is a diagram illustrating an appearance of a mobile terminal and a subject.

FIG. 5 is a diagram illustrating an example of a serial table.

DESCRIPTION OF THE EMBODIMENTS

Figure 2:
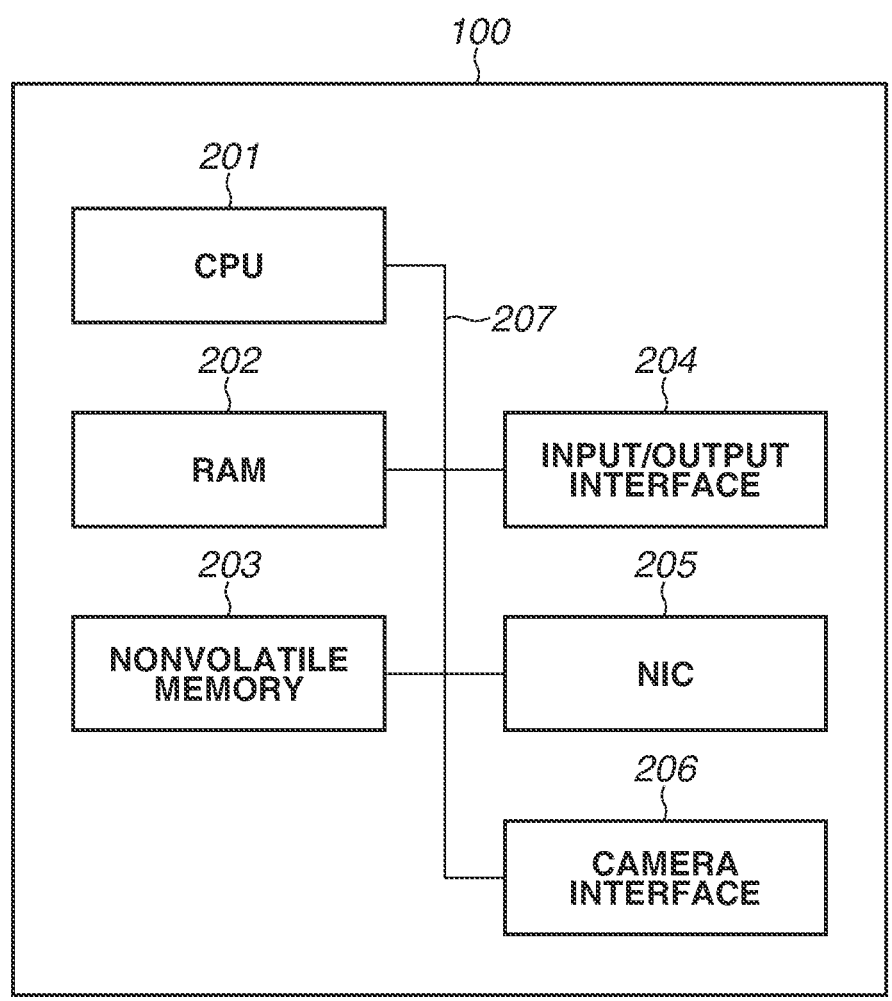
FIG. 2 is a diagram illustrating an example of a hardware configuration of the mobile terminal.

An information processing apparatus according to a present example embodiment will be described with a mobile terminal as an example of the present invention. The mobile terminal is a terminal that can communicate with outside using a wireless communication function or the like.

FIG. 1 is a diagram illustrating an appearance of a mobile terminal 100 (a front surface 101 and a back surface 103 of the mobile terminal 100) and a tire as a subject 105. The front surface 101 of the mobile terminal 100 includes a touch panel display 102 having two functions of a displaying function and a touch operation input function. The back surface 103 of the mobile terminal 100 includes a camera unit 104 that captures an image of the subject 105. In the present example embodiment, a user of the mobile terminal 100 can use a mobile application (described in detail below) 302 operated by a central processing unit (CPU) 201 of the mobile terminal 100, so that the image of the subject 105 can be captured and character recognition processing can be executed. In this example, the subject 105 is a tire. A captured image 106 can be acquired as an image of a portion of the tire including a serial identification (ID) 107 (also referred to as a serial number) captured with the camera unit 104 of the mobile terminal 100. The serial ID 107 is a serial number marked on the tire, and is an ID for uniquely identifying the tire.

The subject 105 is not limited to the tire as in the example described in the present example embodiment. The mobile application 302 described below can take in the image of the subject 105, and output the image to the touch panel display 102.

FIG. 2 is a diagram illustrating an example of a hardware configuration of the mobile terminal 100. The CPU 201 is a processing unit that executes various programs to implement various functions. A random access memory (RAM) 202 is a unit that stores various types of information and is used as a temporary work storage area by the CPU 201. A nonvolatile memory (for example, a read only memory (ROM)) 203 is a unit that stores various programs and data. The CPU 201 loads the program stored in the nonvolatile memory 203 onto the RAM 202, and executes the program. Thus, the CPU 201 (computer) of the mobile terminal 100 executes the program to function as various processing units illustrated in FIG. 3, and executes various steps in flows described below. The nonvolatile memory 203 may be a flash memory, a hard disk drive (HDD), a solid state drive (SSD), or the like. The functions of the mobile terminal 100 and the processing in the flows described below may be entirely or partially implemented by dedicated hardware. An Input/Output interface 204 transmits and receives data to and from the touch panel display 102. A network interface card (NIC) 205 is a unit by which the mobile terminal 100 is connected to a network (not illustrated). A camera interface 206, through which the image of the subject 105 is taken into the mobile terminal 100, is connected to the camera unit 104. The units described above can transmit and receive data to and from each other via a bus 207.

Figure 3:
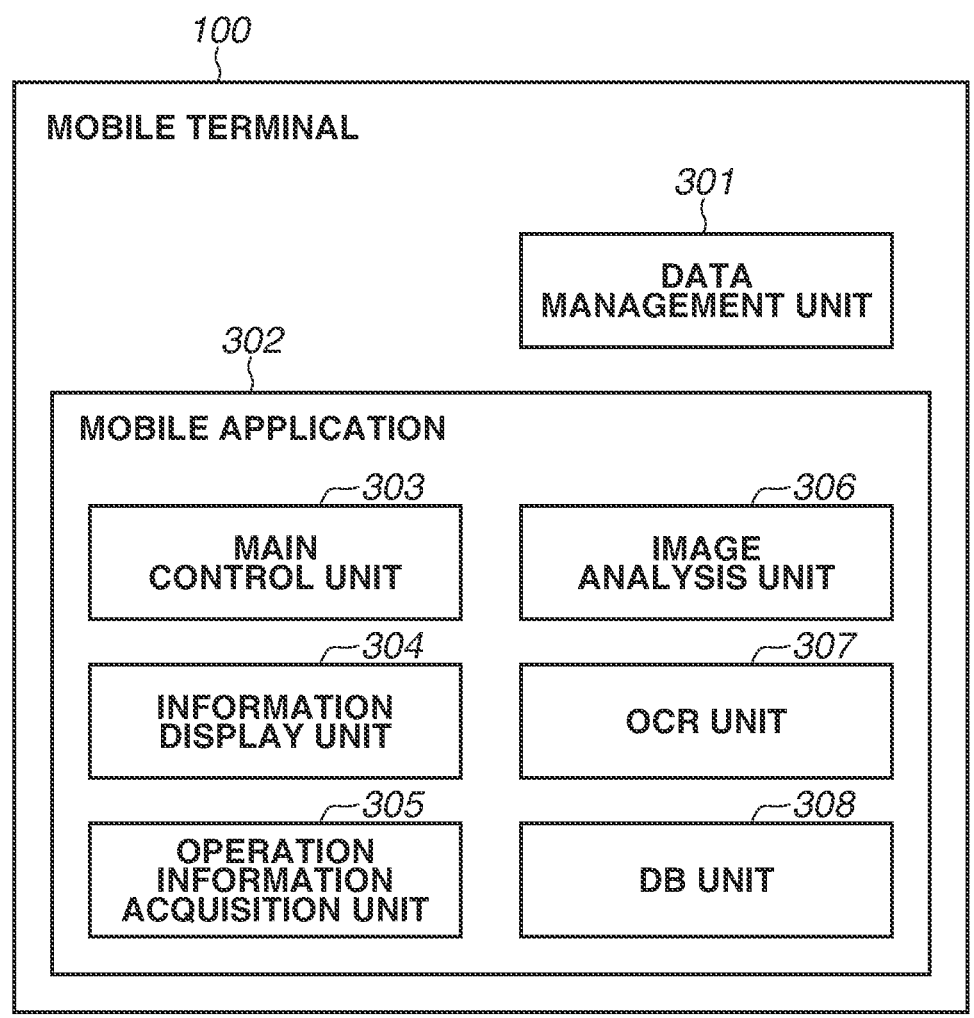
FIG. 3 is a diagram illustrating an example of a software configuration of the mobile terminal.

A software configuration of the mobile terminal 100 will be described. FIG. 3 is a schematic diagram illustrating an example of a software configuration of the mobile terminal 100. The CPU 201 of the mobile terminal 100 executes the mobile application (an application program for the mobile terminal 100) 302 to function as the processing units (processing modules) 303 to 308. An operating system (OS) (not illustrated) of the mobile terminal 100 functions as a data management unit 301.

The data management unit 301 manages an image and application data. The OS provides a control application programming interface (API) for using the data management unit 301. Each application uses the control API to execute processing of acquiring and storing an image and application data, on the data management unit 301.

The mobile application 302 can be executed after being downloaded and installed using an installation function of the OS of the mobile terminal 100. The mobile application 302 executes various data processing on the image of the subject 105 taken in through the camera interface 206.

A main control unit 303 issues an instruction to and manages module units (304 to 308) described below.

Figure 4:
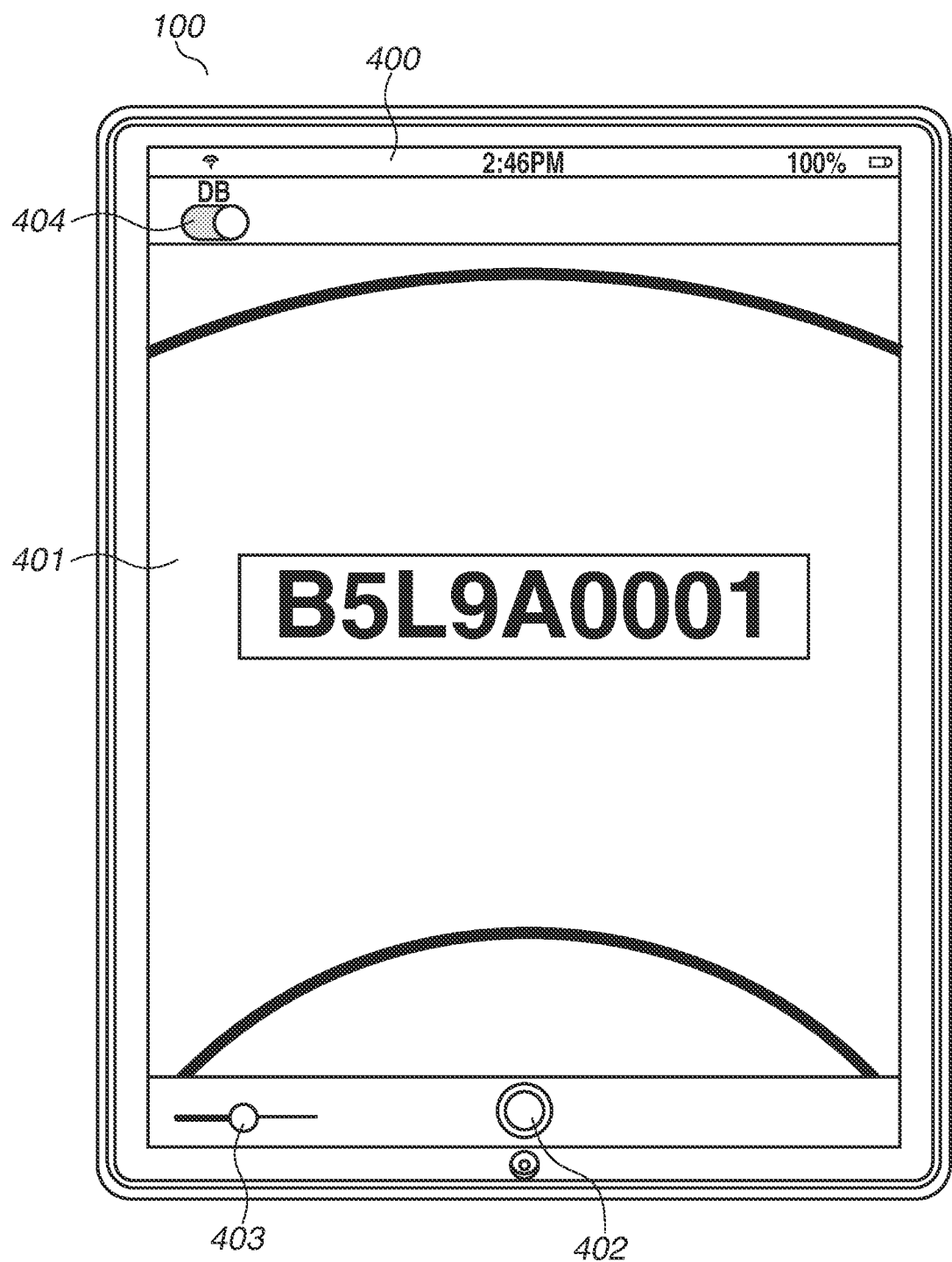
FIG. 4 is a diagram illustrating an example of a user interface (UI) screen of a mobile application.

An information display unit 304 performs control in such a manner that a user interface (UI) of the mobile application 302 as illustrated in FIG. 4 is displayed on the touch panel display 102, according to an instruction from the main control unit 303.

FIG. 4 is a diagram illustrating an example of a screen (a mobile terminal screen 400) of the UI (a UI for a mobile terminal) of the mobile application 302. The mobile terminal screen 400 is displayed on the touch panel display 102 of the mobile terminal 100. The mobile terminal screen 400 displays an image captured by the camera unit 104 on an area 401, and receives an operation by the user (user operation) on the image, or the UI. A shutter button 402 is a button used for storing an image, which has been input from the camera unit 104, in the RAM 202 or the data management unit 301. The image thus stored is hereinafter referred to as a captured image. A zoom button 403 is a button used for scaling the displayed image. A database (DB) matching button 404 is a button used for activating/deactivating DB matching in optical character recognition (OCR) processing to be described below of recognizing the serial ID in the captured image.

The form (the position, the size, the range, arrangement, displayed content, and the like) of the UI of the mobile application 302 is not limited to that illustrated in the drawing, and may be of any appropriate form with which the functions of the mobile terminal 100 can be implemented.

An operation information acquisition unit 305 acquires information on the user operation performed on the UI of the mobile application 302, and notifies the main control unit 303 of the acquired information. For example, when the user touches the area 401 with his or her hand, the operation information acquisition unit 305 detects the information on the touched position on the screen, and transmits the detected information on the position to the main control unit 303.

An image analysis unit 306 analyzes the captured image, and extracts a rectangular area determined to include the serial ID 107. An OCR unit 307 extracts character images from the rectangular area extracted by the image analysis unit 306, and executes OCR processing on each character image. A DB unit 308 has a database function, and manages a serial ID of a tire manufactured by a certain manufacturer and delivered to the corresponding site, as master data in a table.

In the example, it is assumed that the serial ID of the tire manufactured by the certain manufacturer is described under the following configuration rules (description rules).
(1) A character string representing the serial ID includes nine alphanumeric characters.
(2) The first, the third, and the fifth characters are alphabets, whereas the second, the fourth, and the sixth to the ninth characters are numbers.

Thus, a tire with a serial ID not conforming to the rules is manufactured by a different manufacture. The master data on the serial ID managed by the DB unit 308 only corresponds to a tire with the serial ID conforming to the rules, and is not used for managing a serial ID of a tire manufactured by a different manufacture.

The master data on the serial ID managed by the DB unit 308 will be described. FIG. 5 is a diagram illustrating an example of a data structure of a serial table 500 managing the master data on the serial ID and of the serial ID stored in the table, according to the present example embodiment. The serial table 500 includes an id column and a serial ID column. The id column includes a value that is incremented by one each time a record is added to the serial table 500 and is a primary key of the table. A serial ID of each tire is stored in the serial ID column. Serial ID examples 501 to 504 are hereinafter referred to as a serial ID example 1 (501), a serial ID example 2 (502), a serial ID example 3 (503), and a serial ID example 4 (504).

Tires manufactured by various manufacturers may be used on site, and are desired to be collectively managed. When the character recognition result is limited to character strings in the database as in Japanese Patent Application Laid-Open No. 2014-078203, an incorrect recognition result is output when a character string not in the database is read. For example, a configuration of outputting a character recognition result obtained by performing matching against a database of a certain manufacturer may be employed. Unfortunately, this configuration results in outputting an incorrect recognition result when a serial ID of a tire manufactured by a different manufacturer is read. In view of this, a configuration according to the present example embodiment enables a character recognition result to be easily corrected in a mixed environment where a read character string might be in or not in the database, as described below.

<Basic Flow>

Figure 6:
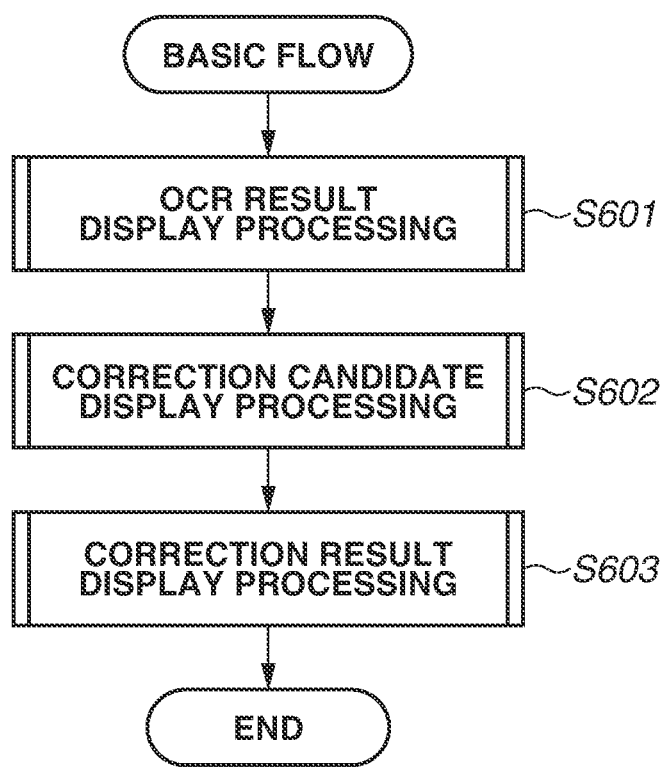
FIG. 6 is a diagram illustrating a flow of basic processing in the mobile terminal.

A flow of basic processing in the mobile terminal 100 will be described with reference to FIG. 6. The flow illustrated in FIG. 6 is triggered by a user booting the mobile application 302 in the mobile terminal 100 and acquiring an image of the subject 105 with the camera unit 104.

In step S601, the CPU 201 of the mobile terminal 100 uses the mobile application 302 to execute OCR result display processing in steps S701 to S712 described below. Thus, processing of character recognition, matching, and displaying is executed for a serial ID.

In step S602, the CPU 201 of the mobile terminal 100 uses the mobile application 302 to execute correction candidate display processing in step S901 to S914 described below. Thus, correction candidates are displayed for a character selected from a serial ID as the recognition result.

In step S603, the CPU 201 of the mobile terminal 100 uses the mobile application 302 to execute correction result display processing in steps S1101 to S1108 described below. Thus, a correction result is displayed for a character string as a serial ID.

<Flow of OCR Result Display Processing>

Figure 7:
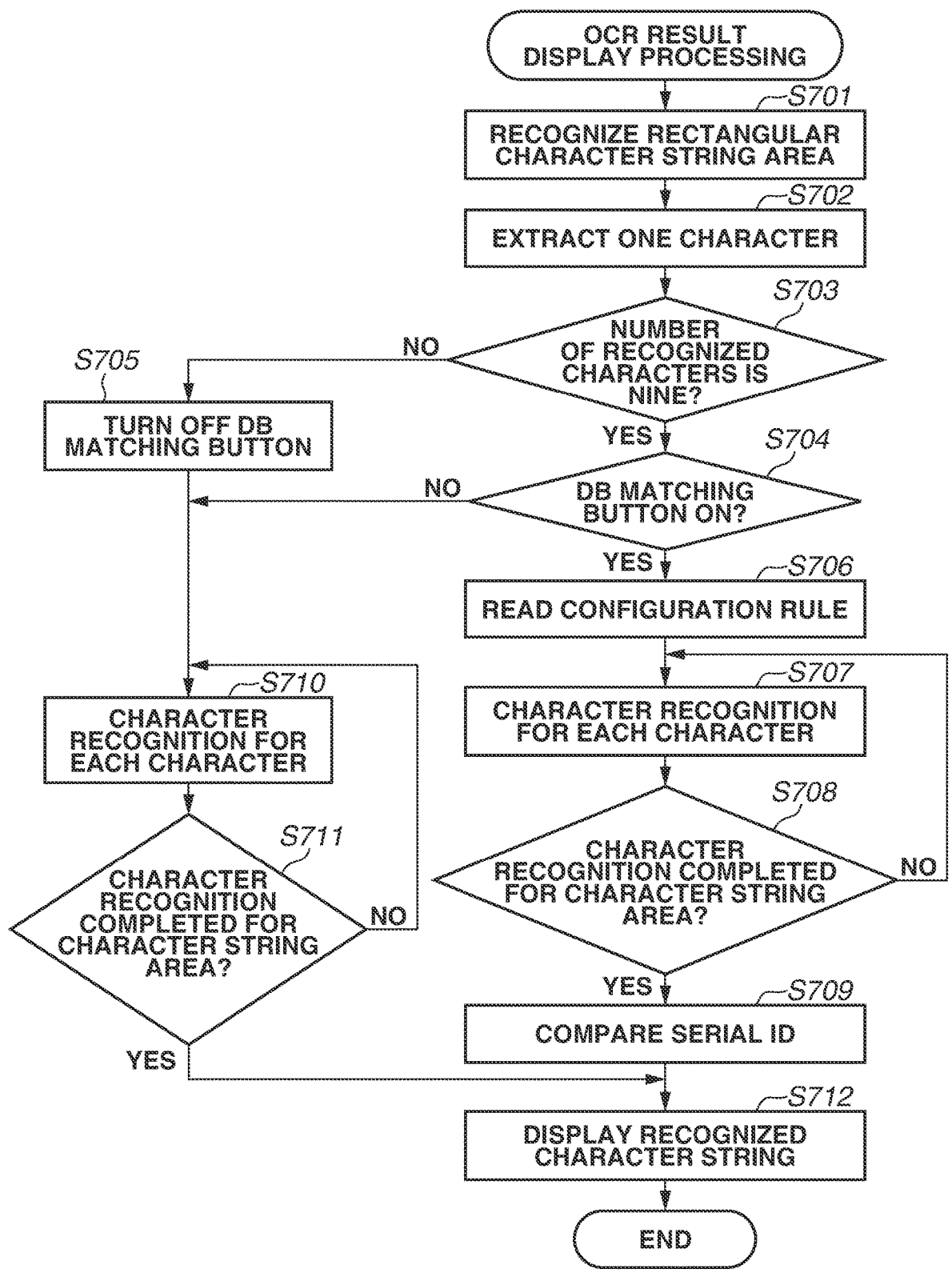
FIG. 7 is a diagram illustrating a flow of optical character recognition (OCR) result display processing.

FIG. 7 is a flowchart illustrating a flow of the OCR result display processing in step S601 in detail. For example, it is assumed in the description below that the flow is executed in the following case. The character recognition processing is executed on each character in a character string image "B5L9A0001", representing the serial ID, to acquire a candidate character for each character. Then, matching against the master data managed by the DB unit 308 is performed. The output character recognition result, limited to the data stored in the database in this example, is "B5L0Z0061".

In step S701, the image analysis unit 306 executes analysis processing on a captured image (a character string image including a plurality of character images) acquired via the camera unit 104 and the camera interface 206, to recognize a rectangular area including the serial ID 107.

In step S702, the image analysis unit 306 executes processing (character extraction processing) of extracting each character image from the rectangular area including the serial ID as described above, and thus recognizes a rectangular area corresponding to each character.

In step S703, the main control unit 303 determines whether the tire is manufactured by a manufacturer corresponding to the master data in the DB unit 308. More specifically, when the number of extracted character images is nine (Yes in step S703), the tire is determined to be likely to have been manufactured by the manufacturer and the processing proceeds to step S704. On the other hand, when the number of character images is not nine (No in step S703), the processing proceeds to step S705. In step S705, the main control unit 303 of the mobile application 302 automatically turns OFF the DB matching button 404, and the processing proceeds to step S710.

In step S704, the main control unit 303 determines whether the DB matching button 404 is ON. When the DB matching button 404 is ON (Yes in step S704), the processing proceeds to step S706. On the other hand, when the DB matching button 404 is OFF (No in step S704), the processing proceeds to step S710.

In step S706, the OCR unit 307 reads the configuration rule of the serial ID registered in advance.

In step S707, the OCR unit 307 executes the OCR processing based on constraint information on the read configuration rule, and executes character recognition on each character. The OCR processing yields pairs each including a recognized character and a certainty factor quantitatively indicating the certainty of the recognized character. The recognized character corresponding to the highest certainty factor is obtained as the recognition result.

In step S708, the OCR unit 307 determines whether the character recognition processing has been completed for all the character images that have been extracted. When the character recognition processing is determined to have been completed (Yes in step S708), the processing proceeds to step S709. When the character recognition processing is determined to have not been completed yet (No in step S708), the processing returns to step S707 and the character recognition processing is executed for the next character image.

In step S709, the OCR unit 307 compares the result of the OCR processing in step S707 with the master data of the serial table 500 managed by the DB unit 308. First of all, a recognition result character string representing the serial ID is obtained by combining the recognition result candidate characters each corresponding to the highest certainty factor relative to the corresponding character. Then, whether this character string is in the serial table 500 is checked. When the character string as the combination of the recognition results is in the serial table 500, the processing proceeds to step S712. On the other hand, when the character string as the combination of the recognition results is not in the serial table 500, the comparing with the serial table 500 is performed again with another character string that is created by a combination of the recognition result candidate characters obtained in step S707 each corresponding to the second highest certainty factor or lower. This processing is repeated until a character string corresponding to any one of serial IDs in the master data in the serial table 500 is found.

In step S710, the OCR unit 307 executes the character recognition processing on each character. In step S711, the OCR unit 307 determines whether the character recognition processing has been completed on all the extracted character images. When the character recognition processing is determined to have been completed (Yes in step S711), the processing proceeds to step S712. On the other hand, when the character recognition processing is determined to have not been completed yet (No in step S711), the processing returns to step S710, and the character recognition processing is executed on the next character image. Thus, the processing proceeds to step S712 when the character recognition processing has been completed on all the character image, and proceeds to step S710 when the character recognition processing has not been completed yet.

Figure 8:
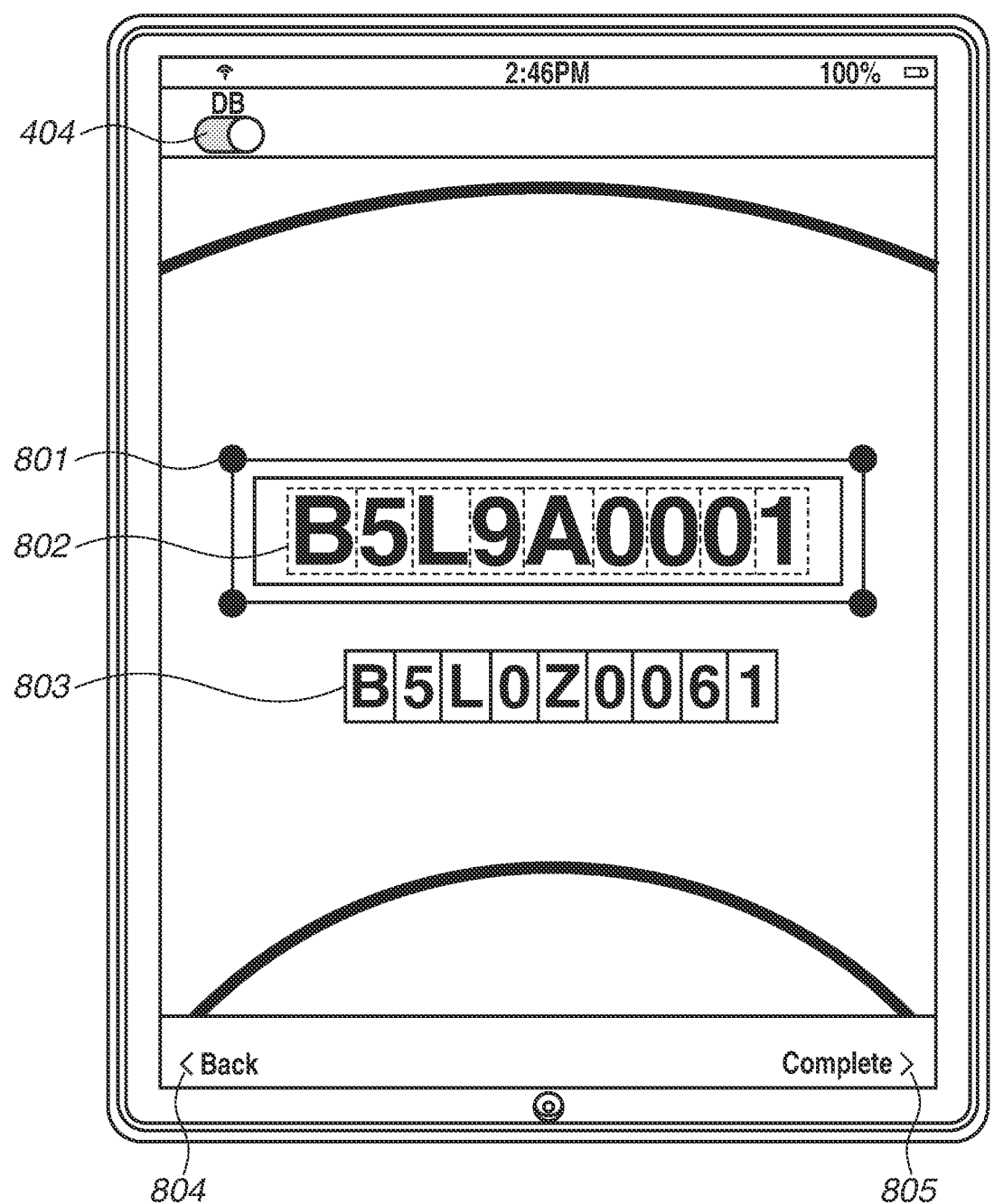
FIG. 8 is a diagram illustrating an example of an OCR result display screen.

In step S712, the information display unit 304 displays the character string as the character recognition result. FIG. 8 is a diagram illustrating an example of the character recognition result displayed on the UI of the mobile terminal screen 400. A serial ID rectangular area 801 represents an example of a rectangular area, including the serial ID 107 recognized by the image analysis unit 306 in step S701, displayed on the UI. A character rectangular area 802 represents an example of rectangular areas each including the character image extracted in step S702. A recognition result character string 803 is an example representing a recognition result character string displayed on the UI in step S712. FIG. 8 illustrates an example where the recognition result character string 803 is "B5L0Z0061", whereas the serial ID rectangular 801 includes an image "B5L9A0001". When the recognition result character string is incorrect, the user can tap and select an incorrect character in the recognition result character string, and correct the selected character with a different character. This character correction processing will be described in detail below. A back button 804 is used to return to a tire image capturing screen illustrated in FIG. 4 for capturing an image again. A complete button 805 is pressed when the recognition result character string 803 is correct, so that the recognition result character string is stored in the database for tire management. The screen may return to the tire image capturing screen after the recognition result character string has been stored in the database by pressing the complete button 805.

As described above, through this flow of the OCR result display processing executed on the captured image of a tire, the character recognition can be executed on the serial ID, the resultant character string can be compared with the database, and the recognition result can be displayed.

<Flow of Correction Candidate Display Processing>

The flow of the correction candidate display processing in step S602 executed in the mobile terminal 100 will be described in detail with reference to FIG. 9. This flow is triggered by the user tapping and selecting any one of the characters in the recognition result character string 803, as a correction target character.

In step S901, the main control unit 303 of the mobile application 302 determines whether the DB matching button 404 is ON. When the DB matching button 404 is determined to be ON (Yes in step S901), the processing proceeds to step S902. On the other hand, when the DB matching button 404 is determined to be OFF (No in step S901), the processing proceeds to step S912.

In step S902, the main control unit 303 determines whether the serial table 500 of the DB unit 308 includes a serial ID that is different from the recognition result character string 803 in a single character, selected by the user, acquired via the operation information acquisition unit 305. When such a serial ID is found (Yes in step S902), the processing proceeds to step S905. On the other hand, when such a serial ID is not found (No in step S902), the processing proceeds to step S903. In other words, whether the serial table 500 managed by the DB unit 308 includes a serial ID only different from the recognition result in a single character selected by the user is determined. For example, the fourth character from the left may be selected by the user from the recognition result character string 803 in FIG. 8. The selected character may be represented by "*", so that the recognition result character string becomes "B4L*Z061". Then, whether the serial table 500 managed by the DB unit 308 includes a serial ID only different in the character "*" is determined.

In step S903, the main control unit 303 determines whether the serial table 500 managed by the DB unit 308 includes a serial ID only different from the recognition result character string 803 in two characters including a single character selected by the user and another character. When such a serial ID is found (Yes in step S903), the processing proceeds to step S905. On the other hand, when such a serial ID is not found (No in step S903), the processing proceeds to step S904. In other words, whether the serial table 500 managed by the DB unit 308 includes a serial ID only different from the recognition result in two characters, including the single character selected by the user, is determined.

In step S904, the mobile application 302 determines whether the serial table 500 of the DB unit 308 includes a serial ID only different from the recognition result in three characters including the single character selected by the user and other two characters. When such a serial ID is found (Yes in step S904), the processing proceeds to step S905. On the other hand, when such a serial ID is not found (No in step S904), the processing proceeds to step S907. In other words, whether the serial table 500 managed by the DB unit 308 includes a serial ID only different from the recognition result in three characters, including the single character selected by the user, is determined.

The present example embodiment employs a configuration of checking serial IDs different from the recognition result in maximum of three characters through the processing in steps S902 to S904. However, this should not be construed in a limiting sense. Alternatively, a configuration of checking serial IDs different from the recognition result in maximum of any other number of characters (for example two characters or four characters) may be employed.

In step S905, the main control unit 303 adds the serial ID, with one to three different characters, found in steps S902 to S904 to a display-item list.

In step S906, the main control unit 303 determines whether the display-item list has reached the upper limit. When the display-item list has reached the upper limit (Yes in step S906), the processing proceeds to step S907. On the other hand, when the display-item list has not reached the upper limit (No in step S906), the processing returns to step S902 and whether there is still another candidate different in one to three characters is checked. In the present example embodiment, the upper limit of the display-item list is three. The determination in step S902 is first performed in the determination in steps S902 to S904. Thus, the serial ID different in a single character is first added to the display-item list, and then the serial ID different in two characters and the serial ID different in three characters are added in this order.

In step S907, the main control unit 303 determines whether at least one item has been added to the display-item list. When at least one item has been added (Yes in step S907), the processing proceeds to step S908. On the other hand, when no item has been added (No in step S907), the processing proceeds to step S911. In step S911, the main control unit 303 turns OFF the DB matching button 404, and the processing proceeds to step S912.

Figure 10A:
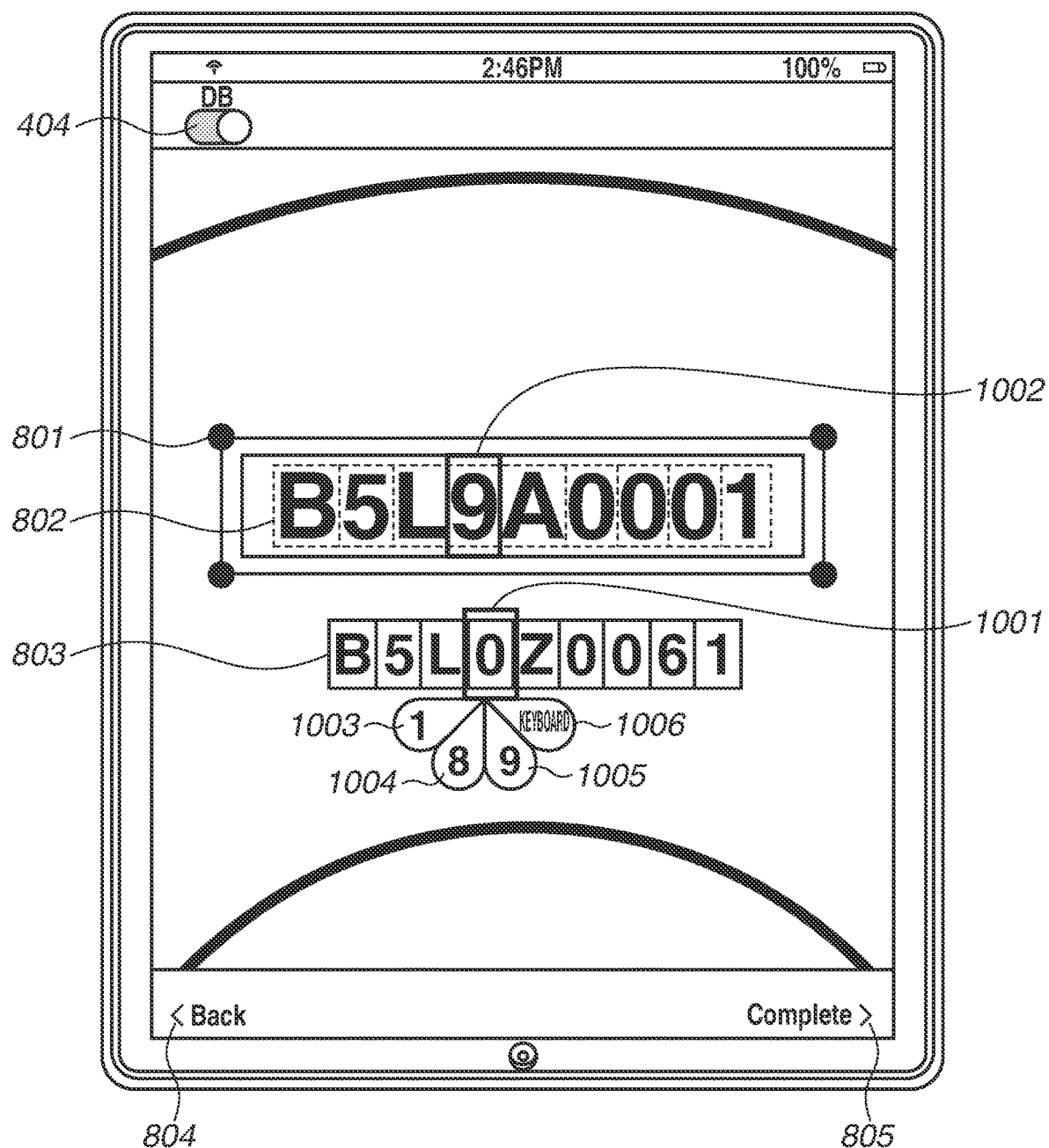
FIGS. 10A and 10B are each a diagram illustrating an example of a screen displaying correction candidate characters.

In step S908, the main control unit 303 displays correction candidate characters for the single character selected by the user, based on the display-item list. FIG. 10A illustrates an example of a UI displaying correction candidate characters. A selection area 1001 represents a highlighted display state of a character recognition result "0". The state indicates that this fourth character from the left in the recognition result character string 803 has been selected as the correction target by the user. A recognition area 1002 represents a highlighted display state of a character image area as the recognition target corresponding to the character "0" in the selection area 1001. With reference to the serial table 500 in FIG. 5, the serial ID 503 different in a single character selected by the user determined in step S902 is added to the display-item list, and then the serial ID 504 different in two characters determined in step S903 is added, and then the serial ID 501 different in three characters determined in step S904 is added. Then, "1", "8", and "9", as fourth characters from the left in the serial IDs, are displayed in a selectable manner as a correction candidate 1003, a correction candidate character 1004, and a correction candidate character 1005 in the order of adding to the display-item list. A keyboard button 1006 is displayed and can be selected to change the screen to that including a keyboard.

In step S909, the main control unit 303 receives an operation performed by the user on any one of the correction candidate characters 1003 to 1005 and the keyboard button 1006, via the operation information acquisition unit 305.

In step S910, the main control unit 303 determines whether an operation of selecting the keyboard button 1006 has been received in step S909. When the keyboard button 1006 has been selected (Yes in step S910), the processing proceeds to step S912. When any one of the correction candidate characters 1003 to 1005 has been selected (No in step S910), the processing proceeds to step S914.

Figure 10B:
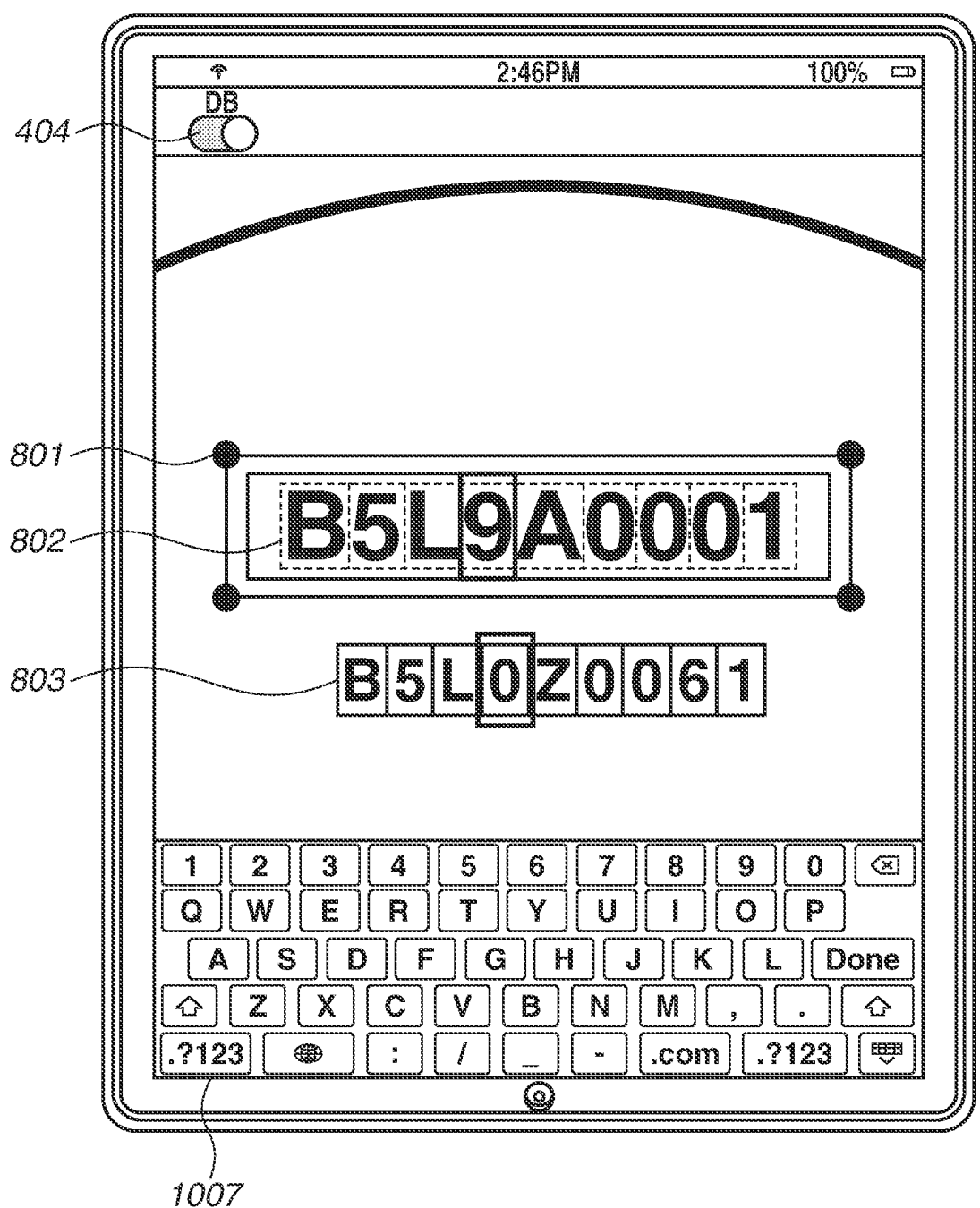

In step S912, the main control unit 303 displays a keyboard 1007 as illustrated in FIG. 10B to receive an input by the user. A standard keyboard supported by the OS may be used as the keyboard 1007.

In step S913, the main control unit 303 displays a result of replacing a correction target character in the selection area 1001 with a character input with the keyboard 1007 in step S912.

In step S914, the main control unit 303 displays a result of replacing the correction target character in the selection area 1001 with any one of the correction candidate characters 1003 to 1005 selected by the user.

Through the correction candidate display processing in the flow described above, the correction candidate characters can be displayed for the correction target character selected in the recognition result character string based on the database. Thus, the user can easily correct an incorrectly recognized character, using the master data managed in the database. The keyboard button 1006 is displayed together with the candidate characters. Thus, when a character string not managed by the master data is read, correction processing using the keyboard can be immediately activated.

<Flow of Correction Result Display Processing>

Figure 11:
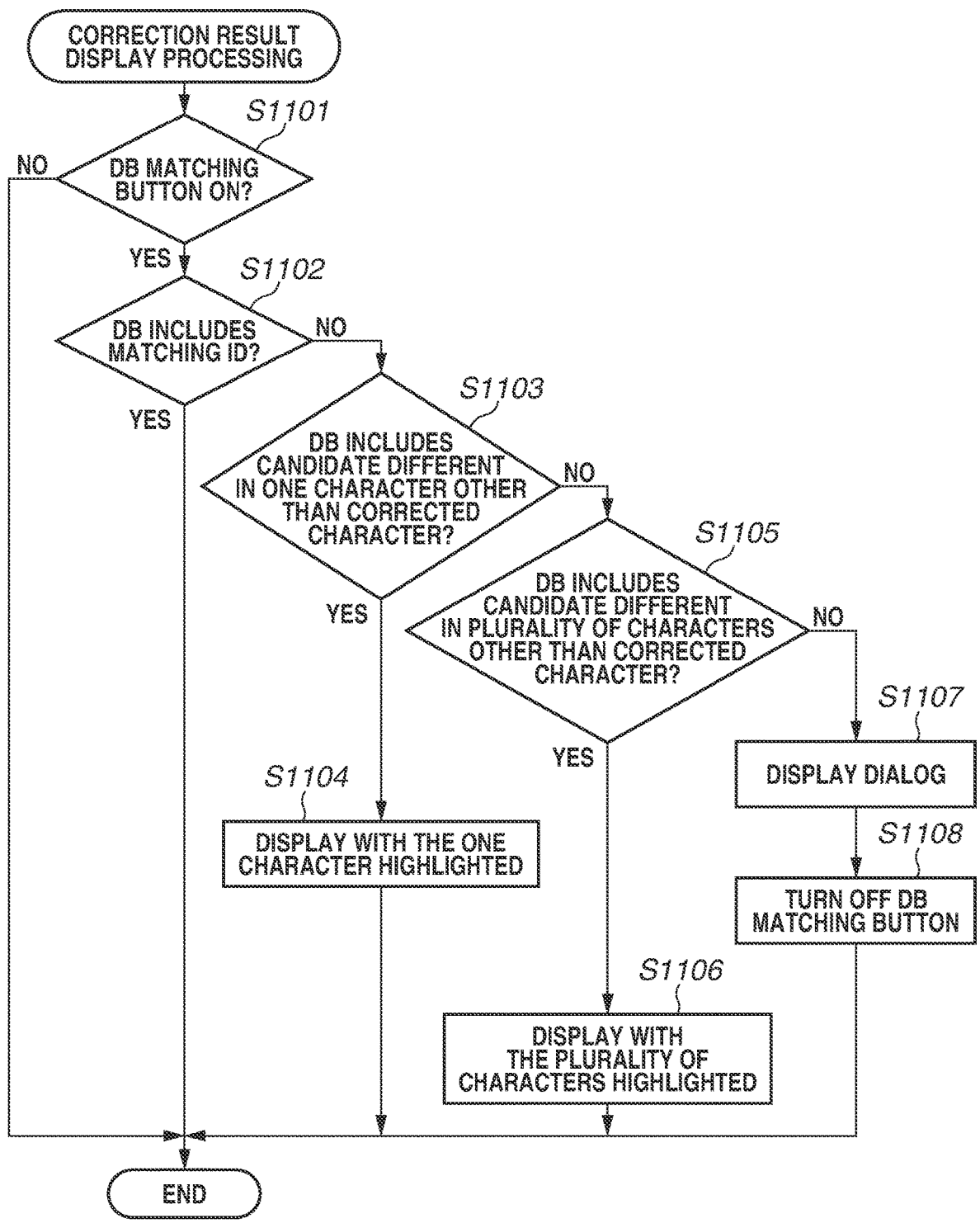
FIG. 11 is a diagram illustrating a flow of correction result display processing.

A flow of the correction result display processing in step S603 will be described in detail below with reference to FIG. 11. The display processing in the flow illustrated in FIG. 11 is executed after the correction of a single character selected as the correction target by the user in the correction candidate display processing in the flow illustrated in FIG. 9.

In step S1101, the main control unit 303 of the mobile application 302 determines whether the DB matching button 404 is ON. When the DB matching button 404 is ON (Yes in step S1101), the processing proceeds to step S1102. On the other hand, when the DB matching button 404 is OFF (No in step S1101), the processing ends.

In step S1102, the main control unit 303 determines whether the serial table 500 includes a serial ID matching the correction result character string. When such a serial ID is found (Yes in step S1102), the processing ends. On the other hand, when such a serial ID is not found (No in step S1102), the processing proceeds to step S1103.

Figure 9:
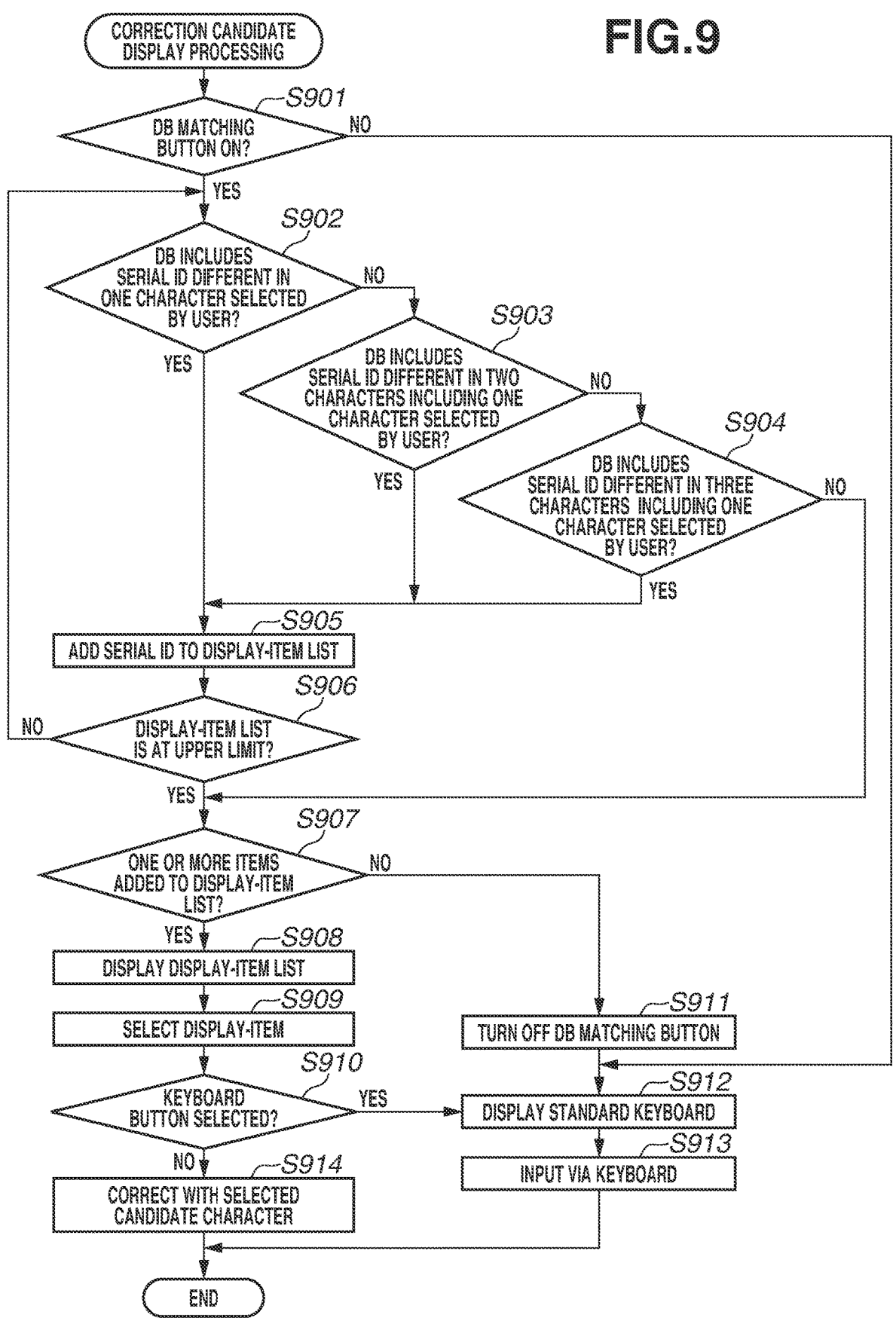
FIG. 9 is a diagram illustrating a flow of correction candidate display processing.

In step S1103, the main control unit 303 determines whether the serial table 500 includes a serial ID different in a single character other than the character corrected in the processing illustrated in FIG. 9. When such a serial ID is found (Yes in step S1103), the processing proceeds to step S1104. On the other hand, when such a serial ID is not found (No in step S1103), the processing proceeds to step S1105.

In step S1104, the main control unit 303 displays the serial ID, which is determined to be different in the single character, with the single character determined to be different highlighted.

In step S1105, the main control unit 303 determines whether the serial table 500 includes a serial ID different in a plurality of characters other than the character corrected in the processing illustrated in FIG. 9. When such a serial ID is found (Yes in step S1105), the processing proceeds to step S1106. On the other hand, when such a serial ID is not found (No in step S1105), the processing proceeds to step S1107.

Figure 12:
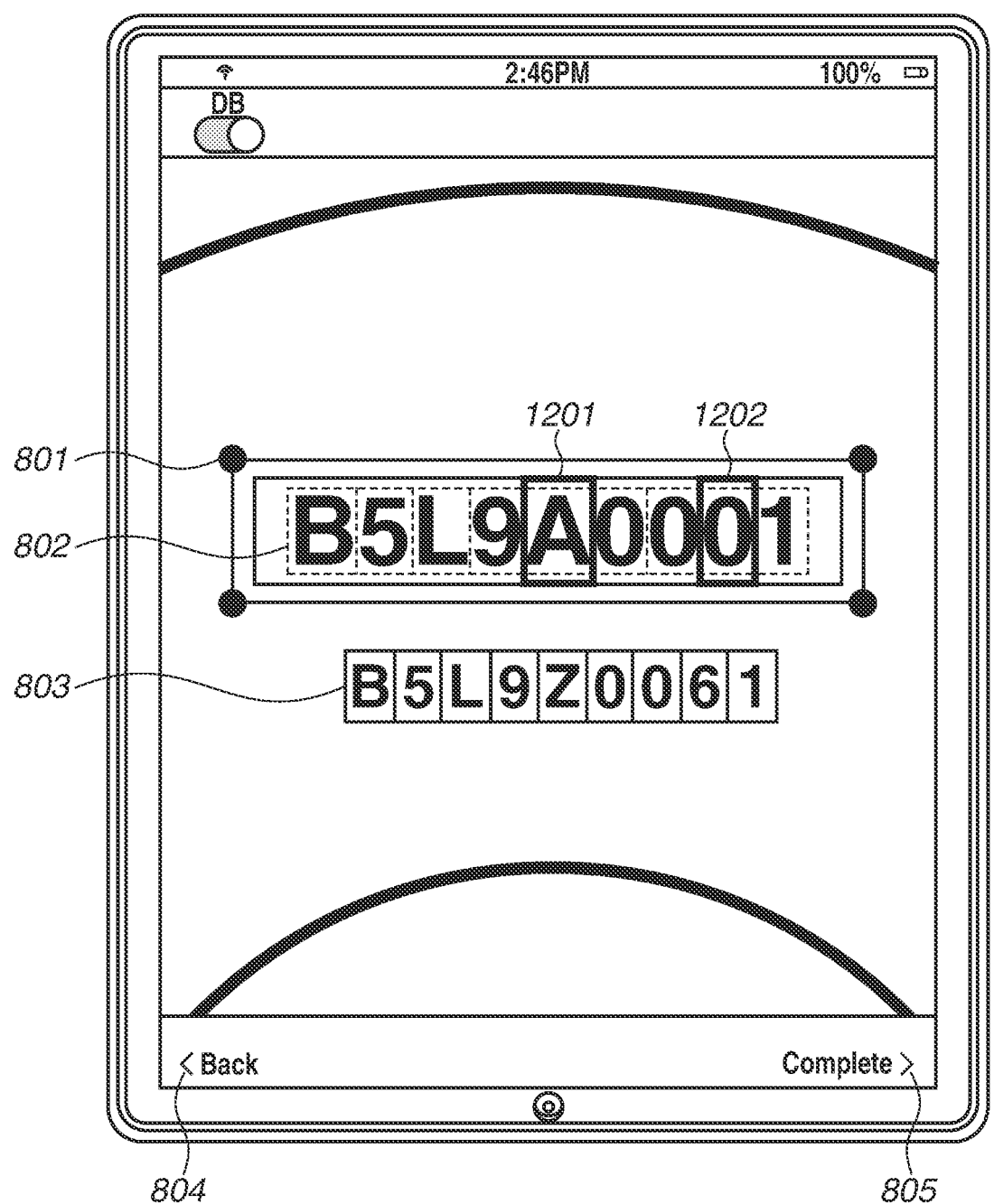
FIG. 12 is a diagram illustrating an example of highlighted displaying after character correction.

In step S1106, the main control unit 303 displays the serial ID, which is determined to be different in the plurality of characters, with the plurality of characters determined to be different highlighted. For example, the correction candidate character 1005 in FIG. 10A may be selected in the processing illustrated in FIG. 9, so that "B5L9Z0061" is obtained as a result of the correction. In such a case, a plurality of characters is displayed while being highlighted as illustrated in FIG. 12 by the processing in step S1106. This "B5L9Z0061" is still different from "B5L9A0001" representing the serial ID 501 in the fifth and the eighth characters from the left. Thus, highlighted display examples 1201 and 1202 in FIG. 12, which are "A" and "0", are displayed while being highlighted to attract an attention of the user as characters that may be incorrect.

Figure 13A:
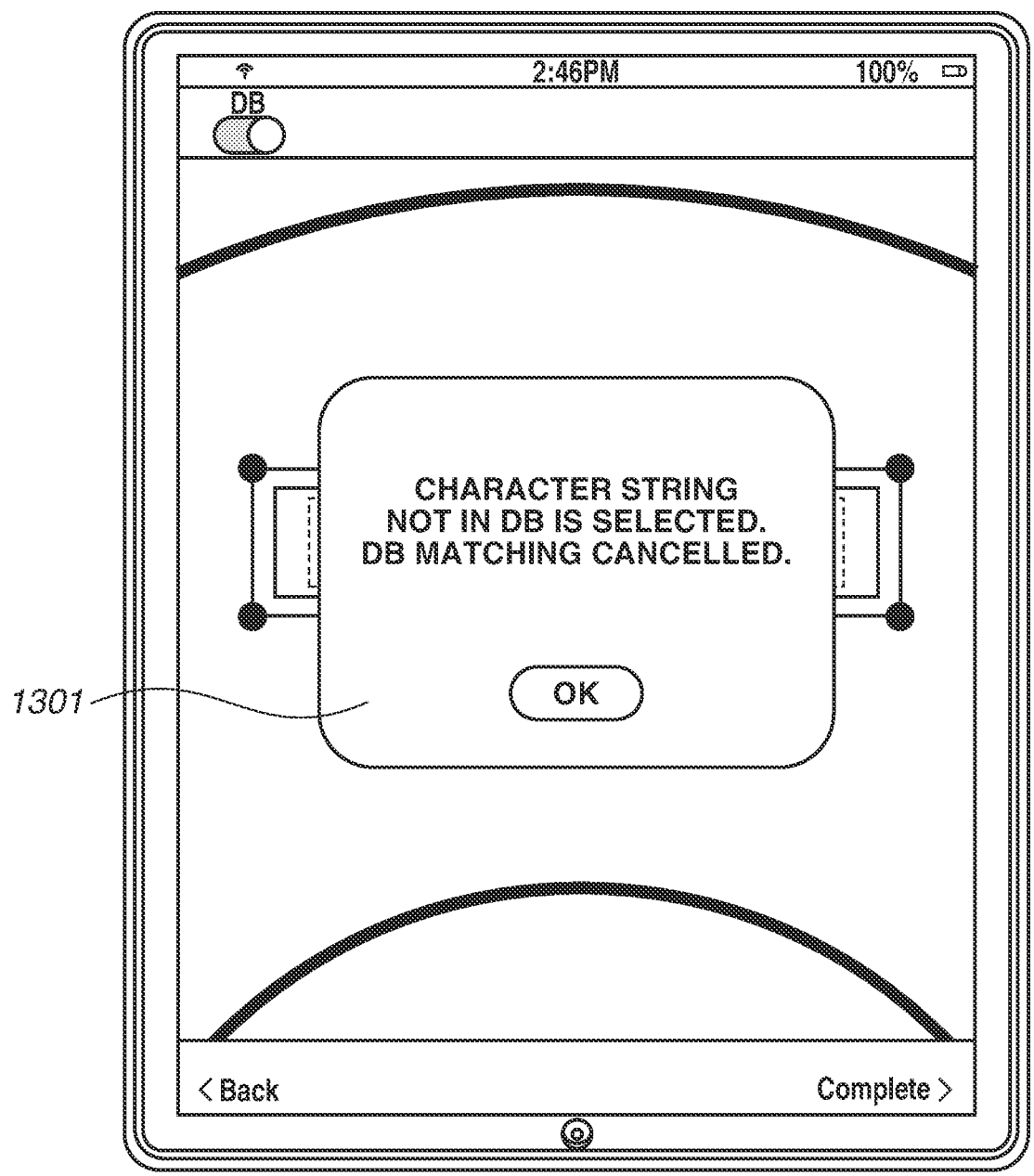
FIGS. 13A and 13B are diagrams illustrating an example of notification indicating that a corrected character string is not in a database.

In step S1107, the main control unit 303 displays a dialog as a notification indicating that the serial table 500 does not include the character string as a result of correction in the processing illustrated in FIG. 9. FIG. 13A illustrates an example of the notification issued using a dialog 1301.

Figure 13B:
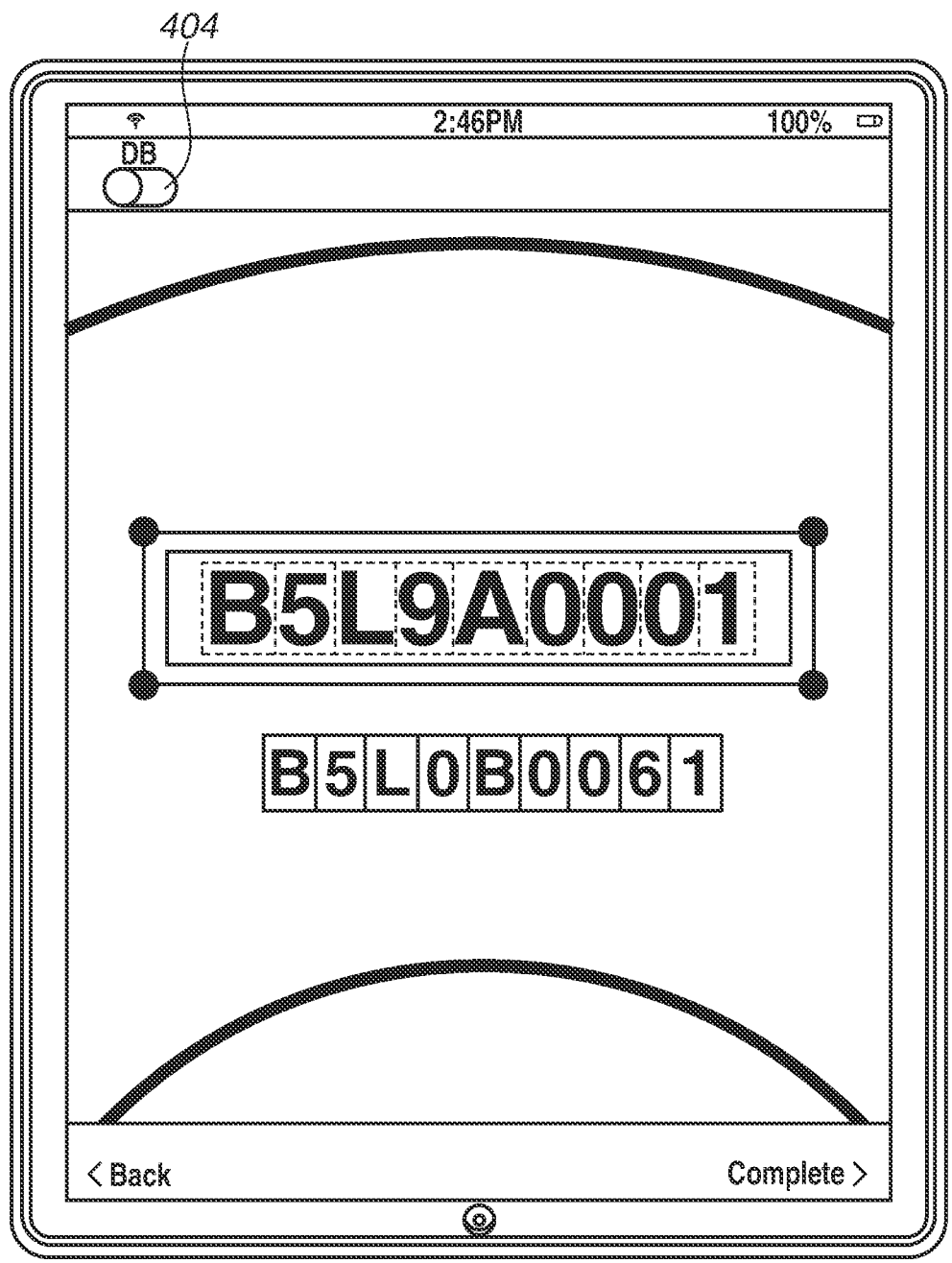

In step S1108, the main control unit 303 automatically turns OFF the DB matching button 404. FIG. 13B illustrates a state where the DB matching button 404 has been turned OFF.

As described above, through the correction result display processing in the flow described above, a portion that might still be incorrect, after the single character has been corrected in the processing illustrated in FIG. 9, can attract attention. The user can check the highlighted portion and correct the portion if required. The highlighted displaying might be performed for a number of a captured image not in the database (the serial ID of a tire manufactured by a different manufacturer or the like). In such a case, the user may press the complete button 805 without correcting the number, so that the recognition result character string can be directly stored in the database.

Other Embodiments

Embodiment of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more above-described embodiment and/or that includes one or more circuits (e.g., application specific integrated circuit (ASIC)) for performing the functions of one or more above-described embodiment, and by a method performed by the computer of the system or apparatus by, for example, reading out and executing the computer executable instructions from the storage medium to perform the functions of one or more above-described embodiment and/or controlling the one or more circuits to perform the functions of one or more above-described embodiment. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to various examples of embodiments, it is to be understood that the invention is not limited to the disclosed examples of embodiments. The scope of the following claims is to be accorded the broadest interpretation so as to encompass all such modifications and equivalent structures and functions.

This application claims the benefit of Japanese Patent Application No. 2016-045468, filed Mar. 9, 2016, which is hereby incorporated by reference herein in its entirety.

What is claimed is:

1. An information processing apparatus comprising:
   a memory that stores a program of instructions; and
   at least one processor in communication with the memory, wherein by executing the program of instructions, the at least one processor performs:
   executing character recognition processing on a character string image including a plurality of characters;
   displaying a character string as a result of the character recognition processing on the character string image;
   in a case where one character in the character string displayed as the result of the character recognition processing is selected by a user, finding a first character string and a second character string from a plurality of character strings managed in a database
   wherein the found first character string is different from the displayed character string in the selected one character,
   wherein the found second character string is different from the displayed character string in a predetermined number of characters that include the selected one character and another character, and
   wherein the predetermined number is two or three;
   displaying at least one correction candidate character for the selected one character based on the found first character string and the found second character string; and
   correcting, when one of the displayed at least one correction candidate character is selected by the user, the character string displayed as the result of the character recognition processing using the selected correction candidate character.

2. The information processing apparatus according to claim 1, wherein by executing the program of instructions, the at least one processor further performs:
   displaying, when the correction candidate character is displayed, a keyboard button with which a keyboard used to input a character different from the correction candidate character together with the correction candidate character; and
   correcting, when the user selects the displayed keyboard button, the character string as the result of the character recognition processing using a character input via the displayed keyboard.

3. The information processing apparatus according to claim 1, wherein by executing the program of instructions, the at least one processor further performs displaying, after correcting the displayed character string using the selected correction candidate character, a character that is different from the corrected character and has a possibility of being incorrect, by checking the plurality of character strings managed in the database to find a character string that is different from the corrected character string in a predetermined number of characters not including the selected one character.

4. The information processing apparatus according to claim 1, wherein the character string displayed as the result of the character recognition processing is a character string that is obtained by executing the character recognition processing on the character string image and by matching the result of the recognition processing against the plurality of character strings managed in the database.

5. The information processing apparatus according to claim 4,
   wherein by executing the program of instructions, the at least one processor further performs displaying a matching button indicating whether the matching against the plurality of character strings managed in the database is to be performed, and
   wherein the character string displayed as the result of the character recognition processing is the character string that is obtained by executing the character recognition processing on the character string image and by matching the result of the recognition processing against the plurality of character strings managed in the database, when the matching button indicates that the matching is to be performed.

6. The information processing apparatus according to claim 5, wherein, when a result of executing the character recognition processing on the character string image including the plurality of characters indicates that number of the plurality of characters included in the character string is different from a predetermined number of characters, the result of the character recognition processing is output without the matching against the plurality of character strings managed in the database.

7. The information processing apparatus according to claim 5, wherein, when any character in the character string displayed as the result of the character recognition processing is selected by the user with a setting of the matching button indicating that the matching is to be performed, the at least one correction candidate character is displayed for the selected one character, based on the found at least one character string.

8. A non-transitory computer-readable storage medium storing a computer program that when executed by a computer causes the computer to perform:
   executing character recognition processing on a character string image including a plurality of characters;
   displaying a character string as a result of the character recognition processing on the character string image;
   in a case where one character in the character string displayed as the result of the character recognition processing is selected by a user, finding; a first character string and a second character string from a plurality of character strings managed in a database,
   wherein the found first character string is different from the displayed character string in the selected one character,
   wherein the found second character string is different from the displayed character string in a predetermined number of characters that include the selected one character and another character, and
   wherein the predetermined number is two or three;
   displaying at least one correction candidate character for the selected one character based on the found first character string and the found second character string; and correcting, when one of the displayed at least one correction candidate character is selected by the user, the character string displayed as the result of the character recognition processing using the selected correction candidate character.

9. An information processing method executed by an information processing apparatus, the information processing method comprising:

executing character recognition processing on a character string image including a plurality of characters;

displaying a character string as a result of the character recognition processing on the character string image;

in a case where one character in the character string displayed as the result of the character recognition processing is selected by a user, finding; a first character string and a second character string from a plurality of character strings managed in a database, wherein the found first character string is different from the displayed character string in the selected one character, wherein the found second character string is different from the displayed character string in a predetermined number of characters that include the selected one character and another character, and wherein the predetermined number is two or three;

displaying at least one correction candidate character for the selected one character based on the found first character string and the found second character string; and correcting, when one of the displayed at least one correction candidate character is selected by the user, the character string displayed as the result of the character recognition processing using the selected correction candidate character.

* * * * *